United States Patent
Yuan et al.

(10) Patent No.: US 10,292,012 B1
(45) Date of Patent: May 14, 2019

(54) REVERSE LOCATIONING WITH BLUETOOTH ANGLE OF ARRIVAL (AOA)

(71) Applicant: Marvell International Ltd., Hamilton (BM)

(72) Inventors: Shuangqing Yuan, Fremont, CA (US); Frank Huang, Dublin, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 15/798,281

(22) Filed: Oct. 30, 2017

Related U.S. Application Data

(60) Provisional application No. 62/415,161, filed on Oct. 31, 2016.

(51) Int. Cl.
  *H04W 4/02* (2018.01)
  *H04W 8/00* (2009.01)
  *H04W 4/80* (2018.01)

(52) U.S. Cl.
  CPC ............ *H04W 4/025* (2013.01); *H04W 4/80* (2018.02); *H04W 8/005* (2013.01)

(58) Field of Classification Search
  CPC ..... H04W 4/025; H04W 4/026; H04W 4/029; H04W 4/80; H04W 8/005; H04W 4/023; H04W 84/12; H04W 64/00; H04W 48/04; H04W 64/003
  See application file for complete search history.

(56) References Cited

U.S. PATENT DOCUMENTS

| | | | | |
|---|---|---|---|---|
| 6,525,685 | B1* | 2/2003 | Rose | G01S 13/4418 342/148 |
| 9,786,146 | B2* | 10/2017 | Markwell | G08B 13/2462 |
| 2011/0269478 | A1* | 11/2011 | Das | G01S 5/14 455/456.1 |
| 2013/0176869 | A1* | 7/2013 | Finlow-Bates | H04W 52/0254 370/252 |
| 2014/0056220 | A1* | 2/2014 | Poitau | H04W 76/14 370/328 |
| 2015/0356563 | A1* | 12/2015 | Vohra | G06Q 20/40145 705/44 |
| 2016/0124068 | A1* | 5/2016 | Jiao | G01S 5/021 341/51 |
| 2016/0183115 | A1* | 6/2016 | Seo | H04W 8/005 455/422.1 |
| 2016/0234704 | A1* | 8/2016 | Aldana | H04L 43/0864 |
| 2016/0327631 | A1* | 11/2016 | Salokannel | G01S 5/12 |
| 2017/0142680 | A1* | 5/2017 | Malkin | H04W 64/00 |
| 2018/0279251 | A1* | 9/2018 | Wigren | H04W 24/10 |

* cited by examiner

*Primary Examiner* — Magdi Elhag

(57) ABSTRACT

Systems and techniques relating to angle of arrival (AoA) reverse locationing include: transmitting, by a first wireless device to a second wireless device, one or more reverse tracking service discovery messages via a wireless communication link; receiving, at the first wireless device from the second wireless device, one or more response messages associated with the one or more reverse tracking service discovery messages, wherein the one or more response messages comprise (i) information indicating that the second wireless device is enabled for reverse tracking, and (ii) angle of arrival (AoA) information based on AoA calculations performed by the second wireless device; and determining, by the first wireless device, a location of the second wireless device based on the received AoA information.

20 Claims, 3 Drawing Sheets

REVERSE LOCATIONING WITH BLUETOOTH ANGLE OF ARRIVAL (AOA)

CROSS REFERENCE TO RELATED APPLICATION

This disclosure claims the benefit of the priority of U.S. Provisional Application Ser. No. 62/415,161 filed Oct. 31, 2016, entitled, "REVERSE LOCATIONING WITH BLUETOOTH AOA", which is incorporated herein by reference in its entirety.

BACKGROUND

This disclosure relates to wireless networking systems and techniques for use in location discovery services.

Wireless communication, such as wireless local area network (WLAN) and Bluetooth technologies, has become ubiquitous in the mobile computing environment. In some wireless network environments, a wireless device having the capability to become aware of its physical location, referred to throughout this disclosure as locationing, may be desirable.

In some existing technologies, locationing can be accomplished by acquiring signal characteristics and range measurements information associated with wireless communication, for example angle of arrival (AoA) locationing. Some AoA locationing techniques can require that the locator, which is the device receiving and processing information for location discovery, have multiple antennas. However, many wireless devices use a single antenna configuration (e.g., for increased portability and smaller hardware size), and thus may not be suitable for performing certain functions to allow for locationing. Also, existing AoA locationing techniques may limit the locationing capabilities of such wireless devices to providing information (to locator devices) to be located, while remaining unaware of location itself. It may be desirable for locationing techniques to support location awareness at more than one wireless devices (e.g., devices on both ends of a Bluetooth pairing).

SUMMARY

This disclosure relates to wireless networking systems and techniques, namely angle of arrival (AoA) reverse locationing. The techniques disclosed within this disclosure can be used in wireless networking technology, such as Bluetooth Low Energy (BLE) technologies mentioned herein.

According to an aspect of the described systems and techniques, a method includes: transmitting, by a first wireless device to a second wireless device, one or more reverse tracking service discovery messages via a wireless communication link; receiving, at the first wireless device from the second wireless device, one or more response messages associated with the one or more reverse tracking service discovery messages, wherein the one or more response messages comprise (i) information indicating that the second wireless device is enabled for reverse tracking, and (ii) angle of arrival (AoA) information based on AoA calculations performed by the second wireless device; and determining, by the first wireless device, a location of the second wireless device based on the received AoA information.

According to another aspect of the described systems and techniques, a wireless device includes: a plurality of antennas; transceiver electronics; and processor electronics programmed to: receive, via the transceiver electronics, one or more reverse tracking service discovery messages using an established wireless communication link; transmit, via the transceiver electronics, one or more response messages associated with the one or more reverse tracking service discovery messages, wherein the one or more response messages comprise (i) information indicating whether the apparatus is enabled for reverse tracking, and (ii) angle of arrival (AoA) information based on performed AoA calculations and using the plurality of antennas.

According to another aspect of the described systems and techniques, a system includes: a first wireless device; and a second wireless device, communicatively coupled with the first wireless device via an established wireless communication link: wherein the first wireless device: transmits to the second wireless device, one or more reverse tracking service discovery messages via the wireless communication link; receives, from the second wireless device, one or more response messages associated with the one or more reverse tracking service discovery messages, wherein the one or more response messages comprise (i) information indicating that the second wireless device is enabled for reverse tracking, and (ii) angle of arrival (AoA) information based on AoA calculations performed by the second wireless device; and determines a location of the second wireless device based on the received AoA information.

The described systems and techniques can result in one or more of the following advantages. The present disclosure describes devices, systems, and techniques for an AoA reverse locationing, thereby extending locationing capabilities, such as location awareness and asset tracking, to wireless devices that may have limited functionality (e.g., single antenna, and limited processing capacity). Techniques implementing both forward locationing and reverse locationing are disclosed, thus allowing for devices at both ends of a wireless communication to be located (and tracked). Also, the present disclosure describes mechanisms to extend locationing capabilities to wireless devices deemed otherwise unsuitable for some existing locationing mechanisms, without necessitating the integration of additional hardware.

BRIEF DESCRIPTION OF THE DRAWINGS

Like reference symbols in the various drawings indicate like elements.

DETAILED DESCRIPTION

The techniques disclosed within this disclosure can be used in wireless networks that employ BLE technologies mentioned herein. For example, with adaptions, the disclosed systems and techniques can be employed with existing Bluetooth standards, such as Bluetooth 5.

Figure 1:
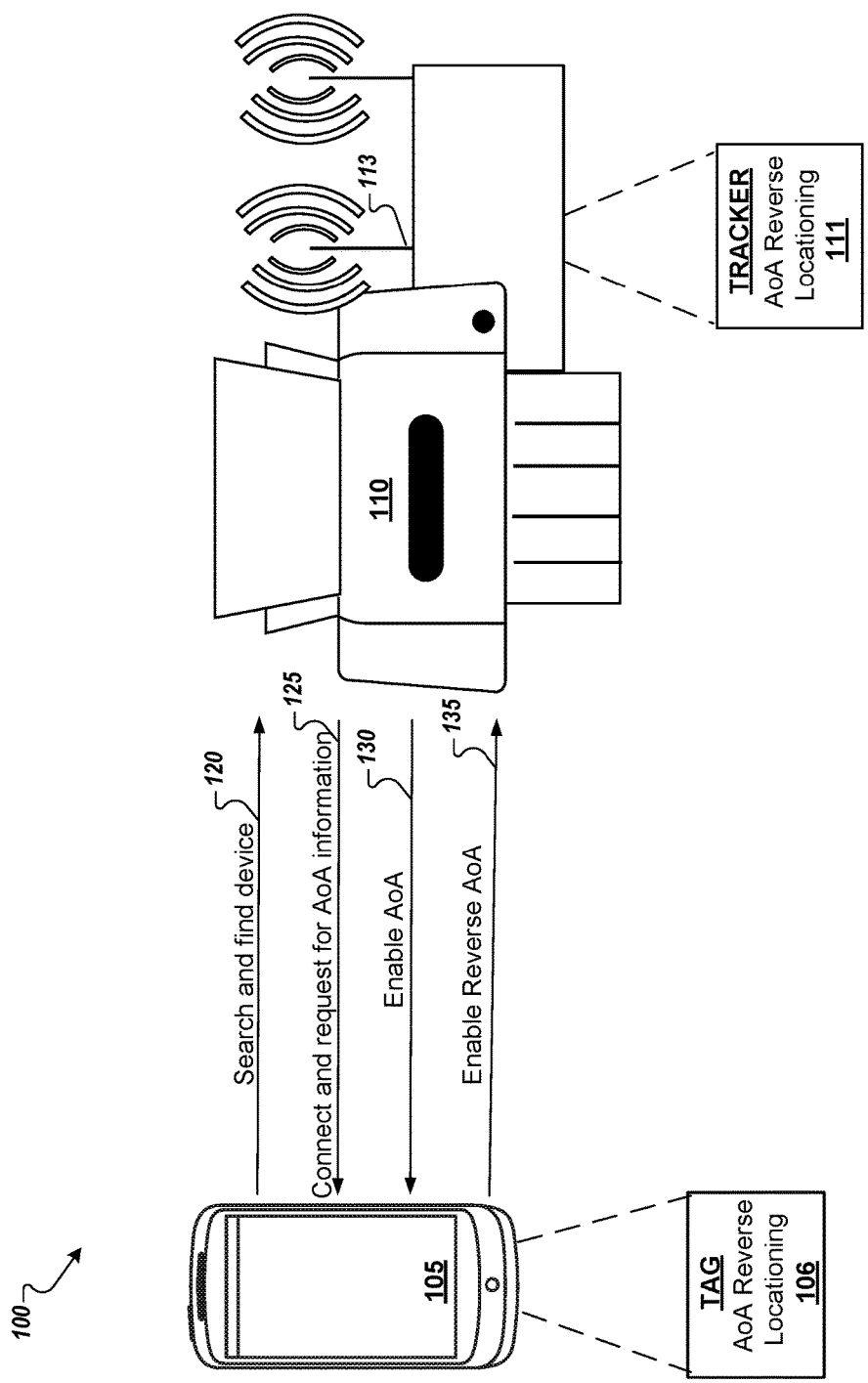
FIG. 1 shows an example of a system employing wireless communication technology, for example Bluetooth Low Energy (BLE), that is used for implementing the AoA reverse locationing techniques disclosed.

FIG. 1 shows an example of a system employing wireless communication technology, for example Bluetooth Low Energy (BLE), that is used for implementing the AoA reverse locationing techniques disclosed. Also, FIG. 1 illustrates a communication exchange between wireless devices in the system 100 that are shown as mobile device 105 and a wireless printer 110. However, it should be appreciated that other wireless devices can be utilized in accordance with the techniques described, and FIG. 1 is intended to illustrate AoA reverse locationing and reverse tracking of a wireless device (e.g., wireless printer 110) by a comparatively smaller wireless device (e.g., mobile device 105). As illustrated in FIG. 1, mobile device 105 and the wireless printer 110 are situated at respective locations, and can be described as having a distance, orientation, and position with respect to each other. Additionally, the devices have a proximity from one another allowing wireless communication to be established, for example a Bluetooth pairing, that communicatively links the mobile device 105, illustrated in FIG. 1 as a smart phone, and the wireless printer 110. This proximity can be limited, or otherwise restricted, to maintain a distance between the devices that is within a range of wireless signal coverage. The range can be related to the wireless technology used (e.g., Bluetooth versus WiFi) and operating parameters (e.g., power, bandwidth, sensitivity) corresponding to an antenna of mobile device 105, and/or the antennas 113 of wireless printer 110. Thus, for purposes of discussion, locationing involves an awareness, or determination, of any of the aforementioned characteristics relating to the location of either the mobile device 105 or the wireless printer 111. Furthermore, asset tracking can relate to monitoring the location (or change of location) of a physical object, device, or human that can be considered an asset, over a period of time. For instance, a mobile app can be installed on the mobile device 105, and used to determine a location of another device, such as printer 110 (using locationing). The mobile app can continue to locate the device at multiple time intervals, or in continuously in real-time. Consequently, it can identify whether the device's location has changed, tracking any movement.

As wireless communication occurs between the mobile device 105 and the wireless printer 110, a wireless signal can arrive at an angle at an antenna 113, for example, and thereby allowing angle of arrival information to be obtained. AoA locationing allows a wireless device, such as wireless printer 110, with a tracker application 111 installed therein to act as a locator and request location information from another device. In this case, the requested device in AoA locationing is a tag, shown in FIG. 1 as mobile device 105 with a tag application 106 installed therein. In some cases, a tag application 106 is physically integrated with mobile device 105. Thus, the mobile device 105 can be configured to function as a tag in accordance with the disclosed forward and reverse locationing mechanisms. For purposes of discussion, the mobile device 105 can be referred to as the tag 105 herein. Similarly, the wireless printer 110 can also be referred to as the tracker 110.

In other cases, the tag application 106 is implemented in a separate and external device that is in communication with the mobile device 105. For instance, the tag application 106 is implemented in small programmable device, such as a key chain or key fob, that can communicate wirelessly with the mobile device 105 and tracker 110 using short-range wireless technology, such as BLE.

As illustrated, the tag 105 and tracker 110 are configured to integrate the disclosed AoA reverse locationing techniques within the system 100. The tag 105 and tracker 110 can generally include software and/or firmware components such as (1) an AoA capable controller, and (2) a profile implementing its respective role (e.g., tag or tracker). In some cases, a standard profile is defined to use BLE AoA technology, Asset tracking profile (ATP), and the services associated with it, namely Asset Tracking Service (ATS).

The profile follows standard BLE profile architectures and can be implemented on top of Generic Attribute Profile (GATT). According to some existing Bluetooth standards, GATT has several predefined profiles and services to ensure interoperability, and support the exchange of profile and user data over a BLE connection (e.g., data transfer procedure). At the profile level of the tag 105 and the tracker 110, ATP defines services and procedures to find location service and control points, which is used to enable/disable AoA response employed in the forward and reverse locationing techniques disclosed. At the controller level, for forward locationing, BLE AoA allows a tracker 110 to transmit a request for location information to tag 105, and if enabled at the tag 105, it will respond to such a request. For reverse locationing, the controller level supports the tag 105 transmitting a notification that reverse tracking is enabled, and the tracker 110 responding with angle notifications. The procedures for AoA locationing and AoA reverse locationing are discussed in greater detail in reference to FIG. 2 and FIG. 3.

For purposes of discussing the systems and techniques herein, AoA can be described as a measureable angle between directions of conveyed wireless signals. For instance, the AoA can be an angle between a propagating direction of a signal and a reference direction. In some cases, AoA is measured against at least one fixed direction, which can also be referred to as the orientation. In some implementations, AoA calculation techniques used for locationing can be based on signal orientation in reference to another device (having known position information). The AoA information, as discussed throughout, can be expressed in any unit of measurement deemed appropriate, such as degrees clockwise (from North). AoA information can also be represented using various other mathematical relationships, including coordinates systems, such as Cartesian, spherical, vector, cylindrical and the like.

FIG. 1 shows the wireless printer 110 configured to use more than one antenna 113. For example, the printer 110 can include at least four antennas for wireless communications and implementing AoA techniques. Accordingly, in acting as a locator, the wireless printer 110 can employ techniques for obtaining AoA measurements using an antenna array.

For purposes of discussion, receiving AoA information from the tag 105, which facilitates tracking of the tag 105 by the tracker 110 is sometimes described as forward AoA locationing, in comparison to the disclosed AoA reverse locationing, which conversely allows for tracking of the tracker 110 at the tag 105.

In system 100, the tracker application 111 and tag application 106 are configured to support forward AoA locationing and reverse AoA locationing, which enables position and/or location awareness at both the tracker 110 and tag 105 devices. Similarly, both the mobile device 105 and the wireless printer 110 are capable of communicating and calculating AoA information to support forward and reverse locationing, according to the disclosed techniques. In some instances, locationing can be performed with various range measurement schemes other than (or in addition to) AoA, including but not limited to: Received Signal Strength (RSS); time of arrival (TOA); and time different of arrival (TDOA). In accordance with the AoA reverse locationing techniques disclosed herein, tracker 110 and the tag 105 are capable of performing all of the transmitting, receiving, processing, and calculation functions necessary for locationing using AoA measurements.

FIG. 1 also illustrates an example of a message flow that can be performed between the tag 105 and the tracker 110 in implementing reverse and forward locationing. The disclosed techniques support a more bi-directional locationing implementation, which allows for the tracker 110 to locate and track the tag 105, and further allows for the tag 105 to locate and track the tracker 110. Thus, system 100 is suitable for applications centered around use of a mobile device 105, for example a smart phone, which is ubiquitous in wireless environments. That is, in referring to the FIG. 1, there may be more likelihood of a user employing a mobile device 105 to locate and track the wireless printer 110, and thus implementing the reverse locationing techniques, than the converse.

FIG. 1 shows an initial message exchange 120 involving searching and finding an available device. As an example, the mobile device 105 is used to find the wireless printer 110 within its range, and employs the tag application 106 to transmit advertisement packets that can serve to notify the tracker application 111 of its available connectivity.

Then, next in the communication flow, exchange 125 involves connecting and requesting AoA information. Once the wireless printer 110 is found, the exchange 125 can involve tracker application 111 transmitting the commands and information needed to establish a wireless connection with the mobile device 105 via a wireless communication technology. For example, exchange 125 can be described as a Bluetooth pairing of the mobile device 105 and the wireless printer 110 using BLE. In some cases, the exchange at 125 can include the tag application 106 and tracker application 111 communicating service discovery messages between their respective devices. As such, the entities can indicate to that asset tracking services and/or revert asset tracking services are available.

Moreover, exchange 125 is illustrated to include the tracker application 111 initially requesting AoA information (in accordance with forward locationing aspects). As an example, AoA calculations can be made with respect to the communications between the devices, as wireless signals (that may be related to the transmission of service discovery messages) arrive at a particular wireless device (at an angle). For example, the tracker application 111 may have a known position with respect to its device's location, and thus the tracker application 111 can use the requested AoA information from the tag 105 to estimate the location of the tag 105 relative to the tracker's known positions. Thus, locating the tag 105 is accomplished using the AoA techniques as discussed in above, which can involve wireless signals from the mobile device 105 arriving at particular angles at the multiple antennas 113 of wireless printer 110. In some cases, tracker 110 can increase locationing accuracy by obtaining AoA measurements corresponding to multiple antennas 113. That is, the multiple antennas 113 can gather more AoA information. The increased amount of AoA information, which is further aggregated from the multiple sources (antennas), can yield more robust AoA calculations, and allow for location estimations to be made in relation to multiple orientation points (e.g., triangulation).

Then, based on discovering that both (or either one of) tracking and reverse tracking services are supported by the tag 105 and tracker 110, the message flow can proceed to exchange 130, which includes information to enable AoA locationing and exchange 135. Upon enabling forward and reverse locationing, both the tracker 110 and tag 105 can communicate the AoA information necessary for locating the opposing wireless device.

Figure 2:
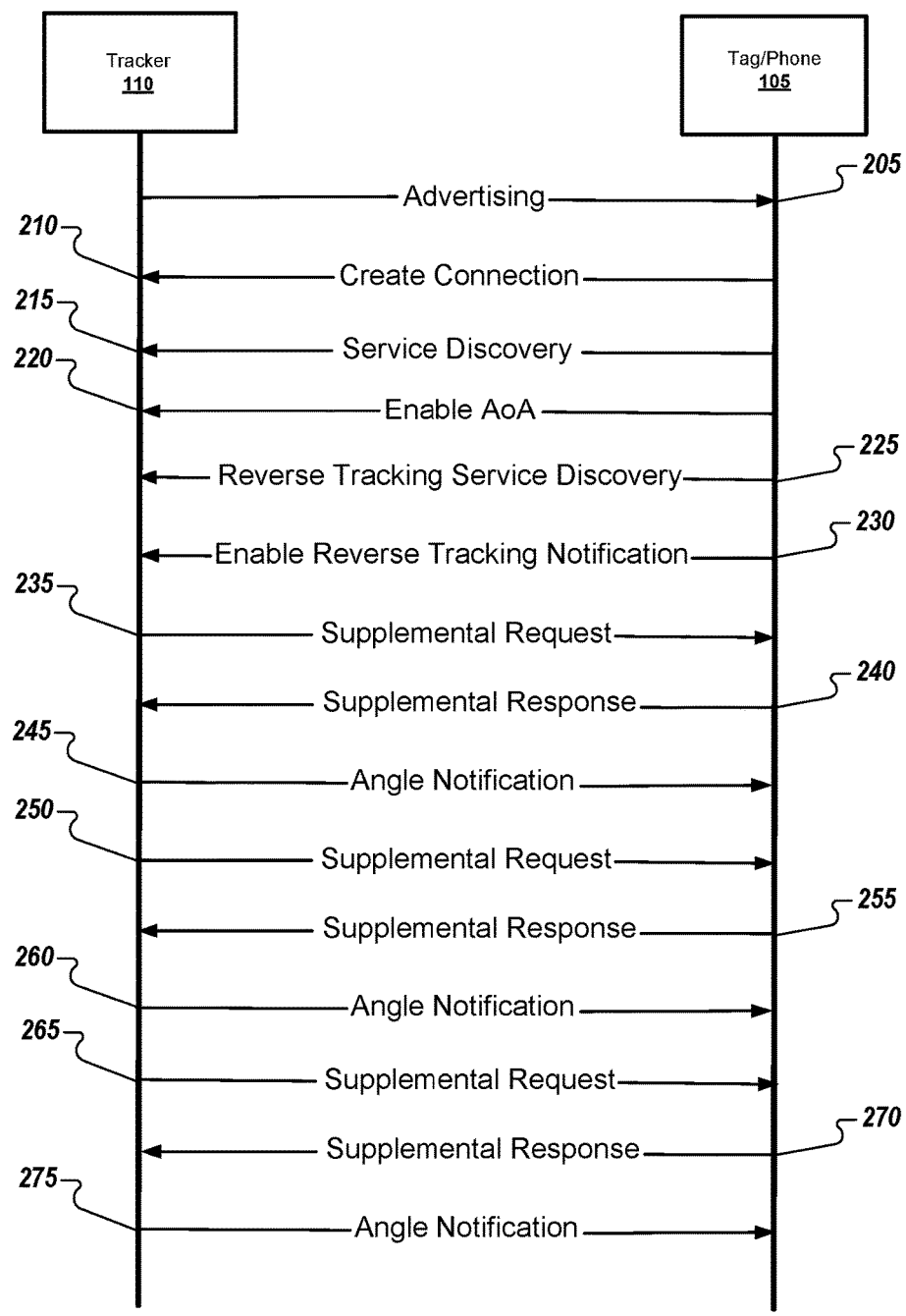
FIG. 2 shows an example of a message exchange flow between wireless devices, according to the AoA reverse locationing techniques disclosed.

FIG. 2 shows an example of a message exchange flow between wireless devices, according to the AoA reverse locationing techniques disclosed. As illustrated by FIG. 2, implementing an AoA reverse locationing scheme involves transmitting a series of messages between the tracker 110 and the tag 105. At a first message exchange 205 of the sequence, the tracker 110 transmits a message to the tag 105 for advertising. For example, the tracker 110 can broadcast one or more advertisement packets, so as to advertise its availability to the tag 105 in accordance with BLE technology. Additionally, in sending advertisement packets to tag 105, the tracker 110 communicates information that may be used by the tracker 110 in order to later establish a wireless connection. For instance, an advertisement packet that is transmitted from tracker 110 to tag 105 can include its Bluetooth address. In some cases, the tracker 110 is in an advertising mode during the exchange 205 allowing the device to transmit the advertisement packets utilizing a dedicated BLE advertising channel. The tag 105 is configured to listen to the BLE advertising channel for any advertisement packets that may be communicated during exchange 205, also referred to as scanning. From actively scanning the BLE advertising channel within a scan interval in exchange 205, and receiving communicated advertisement packets, the tag 105 can discover nearby devices, such as tracker 110.

Next in the flow, exchange 210 involves the tag 105 establishing a connection based on its discovery of tracker 110. During exchange 210, the tag 105 can transmit one or more messages to the tracker 110 that are used to create a wireless connection. For example, the tag 105 can set up a wireless connection with tracker 110 using BLE in exchange 210. According to this example, a connection interval occurs in exchange 210, in which the tag 105 sends a connection request to the tracker 110 containing specified connection parameters (e.g., connection interval, channel map) for the new BLE connection. In some cases, it is not necessary for the tracker 110 to respond the tag 105 directly, in response to the connection request. Upon accepting the connection request, the tracker 110 can tune its receiver to an appropriate frequency, thereby setting a channel to establish the BLE wireless connection with tag 105.

After the tag 105 has made a wireless connection to tracker 110, tag 105 can begin the communication taking place within exchange 215 to perform service discovery. In continuing with the example of a BLE connection, the tracker 110 can discover the services that tag 105 may offer by receiving packets utilizing GATT. GATT permits service browsing and searching for specific services. It is in exchange 215, where the tag 105 sends a service query, for example a GATT packet, interrogating tracker 110 for its supported services which can include tracking services, also referred to ATS. Exchange 215 includes the tag 105 receiving a response from tracker 110 that includes service related data, for example GATT data. Based on the messages in exchange 215, the tag 105 can discover that the tracker 110 offers tracking services, and thus can be tracked by the tracker 110 in accordance with the disclosed forward locationing techniques. In some implementations, the tag 105 can communicate with an entity other than tracker 110 that suitably maintains service information, such as an GATT server to conduct its service discovery in exchange 215.

Thereafter during exchange 220, in the scenario where tracking services are supported by tracker 110, the tag 105 enables AoA techniques to start tracking a location for tracker 110. In some cases, enabling AoA in exchange 220 involves the tag 105 setting up a dedicated connection with the tracker 110 to access the tracking service. Then, sending an AoA request to probe tracker 110 using the new connection. Subsequent to enabling AoA, tracker 110 is permitted to send its AoA response to tag 105. As previously discussed in reference to FIG. 1, AoA responses are used for AoA value determinations and accomplishing forward locationing. Also, as discussed in reference to FIG. 1, at the profile level, aspects of the tracker 110 (e.g., ATP) are configured to define the services and procedures used to enable/disable AoA responses performed in exchange 220. In some implementations, an initial AoA response is communicated by tracker 110 to the tag 105 during exchange 220. In other implementations, tracker 110 transmits AoA responses later in the communication flow, for instance after reverse tracking services are discovered.

Exchange 225 involves service discovery, particularly for the reverse tracking services that are implemented by the disclosed techniques. Exchange 225 can be generally described as including the details of service discovery, as discussed in referring to exchange 215. However, as reverse tracking services may be implemented as part of the tracker profile, tag 105 discovers the reverse tracking services supported by the tracker 110 (rather than the tracker discovering tracking services at the tag exchange 215). Accordingly, exchange 225 can include the tag 105 transmitting a service discovery query to tracker 110. In some cases, information within a GATT packet can be manipulated to specify that a device is capable of services that may not be defined by existing Bluetooth standards, such as reverse tracking.

Following exchange 225 in the sequence, exchange 230 enables reverse tracking. The tag 105 can transmit a notification to tracker 110 that enables the AoA reverse locationing, allowing the tag 105 to track, or reverse track, the tracker 110. Similar to enabling AoA in exchange 220, enabling reverse tracking permits the proper responses implementing reverse AoA locationing to be transmitted from the tracker 110. As illustrated in FIG. 2, the reverse tracking responses are implemented as angle notifications in exchanges 245, 260, 275.

In some cases, multiple requests from the tracker 110 for AoA information are transmitted to the tag 105 following its initial request (e.g., upon enabling AoA). Several subsequent requests, referred to as supplemental requests, from the tracker 110 are shown in the flow as exchanges 235, 250, and 265. Correspondingly, the tag 105 sends its response triggered by each supplemental request received from the tracker 110. The supplemental responses transmitted from tag 105 are shown in FIG. 2 in exchanges 240, 255, and 270. The supplemental responses from tag 105 can be used by the tracker 110 to update tracking information, or to aggregate additional AoA information for more precise AoA calculations and improved locationing accuracy.

Upon receiving an AoA response from tag 105, for instance in exchange 240, the tracker 110 can sample supplemental data in the supplemental responses by switching its antennas, generate I/Q samples (I/Q components of the received raw BLE signal for AoA implementation) and report them to aspects of the profile (e.g., host), for example via a host controller interface (HCI). The switch pattern for the antennas is controllable by the host, and I/Q samples are formatted and sent back to the host in accordance with Bluetooth standards. Accordingly, the report can include AoA information. These reports, employed in forward and reverse locationing, can be generated using functions programmed to read events directly from the radio firmware (FW) during its operation, and to be combined with API configuration parameters as inputs. The report output, namely the AoA responses, can include value of AoA, the RSSI, and the RSSI back-off values. The reports can be used as a mechanism, including data structures, parameters, and values needed to convey the AoA information in AoA responses/supplemental responses 240, 255, 270 communicated from the tag 105 to the tracker 110 (for forward locationing), and angle notifications 245, 260, 275 communication from the tracker 110 to the tag 105 (for reverse locationing). In some cases, the RSSI values are used to enhance AoA performance. For example, the RSSI feedback values are sent back to the radio FW through the HCI command.

In response to enabling reverse tracking, the tracker 110 is configured to send angle notifications to tag 105. Exchanges 245, 260, and 275 illustrate the tracker 110 transmitting angle notifications to tag 105. Upon receiving an angle notification from tracker 110, the tag 105 is imparted with the information necessary to implement reverse tracking of the tracker 110. In some cases, the tag 105 does not have the capabilities for obtaining AoA measurements directly from received signals, using range-based schemes for example. Thus, the angle notifications received by the tag 105 can be formatted in accordance with a protocol adapted for AoA reverse locationing techniques. In this protocol, an AoA capable device utilizes messages with specified parameters, data structures, and values relating to AoA in order to effectively communicate angle positioning (that is derived using range-based schemes on signals) to another device. Using this information, the other device can obtain information about their orientation from the AoA capable device. For example, tag 105 can determine a position for locating the tracker 110 with respect to an angle of arrival as determined by, and received from, the tracker 110. In some implementations, the tag 105 is configured to use an algorithm adapted for AoA reverse locationing, which allows the tag 105 to use the angle notification to perform the AoA calculations for locating the tracker 110.

Alternatively, the tracker 110 applies AoA calculations, using the algorithm adapted for reverse locationing, to determine position and/or location information for the tracker 110 itself and the tag 105. With the tracker 110 being aware of its location and the location of tag 105, the tracker 110 can utilize reverse locationing (e.g., angle notification) to notify the tag 105 of the derived location of the tracker 110. Thus, allowing the tag 105 to locate the tracker 110, while precluding the need for the tag 105 to perform calculations related to reverse AoA locationing, which may be complex (e.g., requiring large processor usage).

Figure 3:
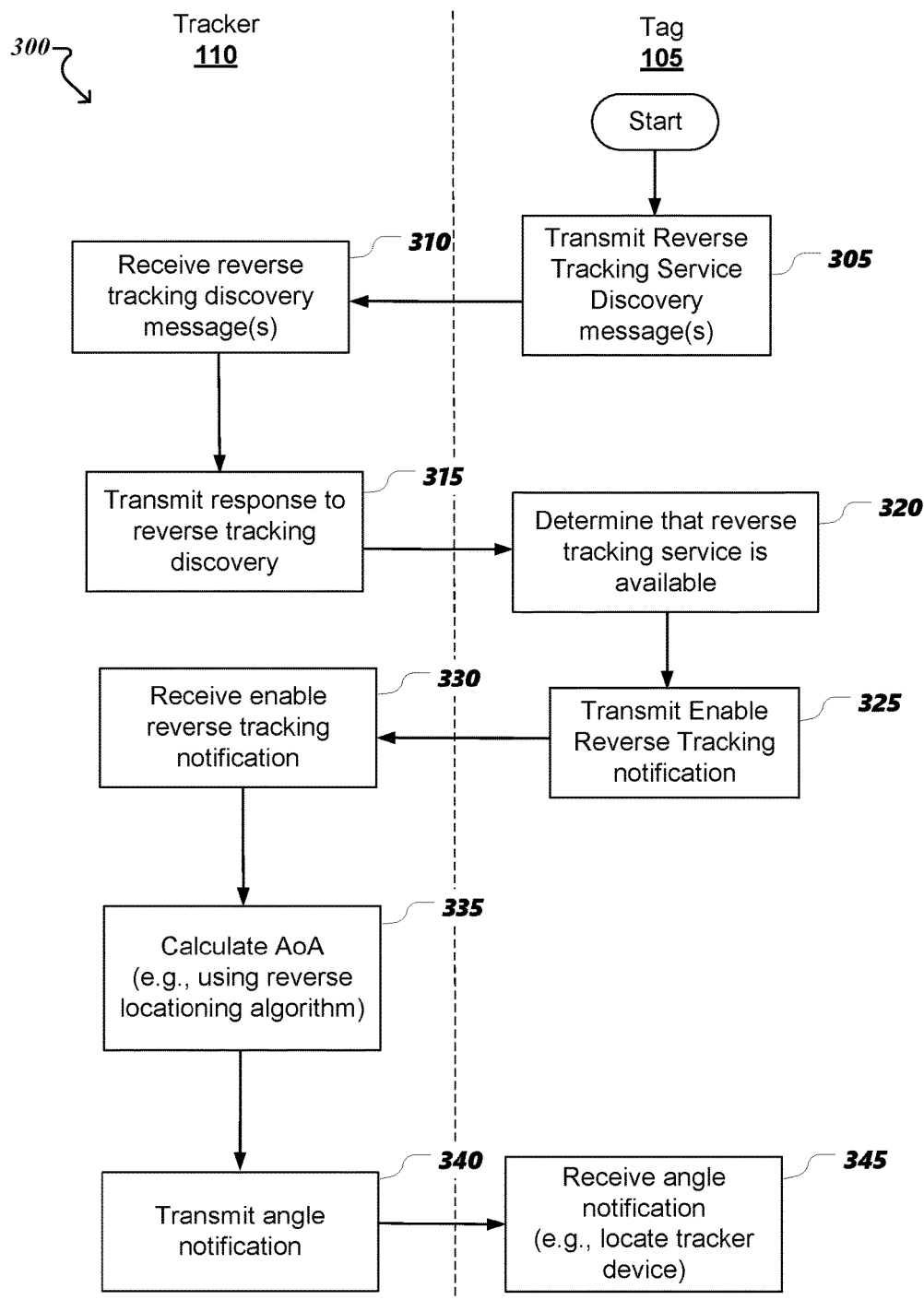
FIG. 3 shows an example of a process implementing the AoA reverse locationing techniques disclosed.

FIG. 3 shows an example of a process 300 implementing the AoA reverse locationing techniques disclosed. The process 300 illustrates a procedure that pertains to the reverse tracking aspects of the invention, where the tag 105 performs a reverse tracking of the tracker 110. For example, the tag 105 can be a mobile device, such as smartphone, that is used for locating a tracker 110 that is a wireless printer. Thus, the process 300 can be a subset of a larger bi-directional process for conducting both the forward and reverse tracking between the wireless devices acting as the tracker 110 and the tag 105. The process 300 begins at 305, where the tag 105 transmits one or more reverse tracking service discovery message to tracker 110 via an established wireless communications link. In an example, the tag 105 and the tracker 110 roles are implemented as hardware and software components within BLE enabled wireless devices, and the wireless communications link can be a BLE connection. In some cases, the reverse tracking service discovery messages can be GATT packets.

The tracker 110 receives the reverse tracking discovery messages from the tag 105 at 310. Then, in response to receiving the reverse tracking discovery message, at 315 the tracker 110 transmits a response back to the tag 105. In the case where the tracker 110 supports reverse tracking services, the response sent from the tracker 110 communicates that there is an interoperability between the tag 105 and the tracker 110 for supporting reverse tracking. For example, a profile for tracker 110 includes a reverse tracking service, allowing for a smartphone to locate the wireless printer device associated with the tracker 110 role. Accordingly, the response that is transmitted from the tracker 110 at 315 effectively notifies tag 105 that the reverse tracking is an available service. Otherwise, in the case where the tracker 110 does not include reverse tracking services, the response at 315 serves to notify the tag 105 that it cannot conduct a reverse tracking of the tracker 110, as the service is not supported.

At 320 the tag 105 can perform a check of the response that is received from tracker 110. In the scenarios where reverse tracking service is available, the tag 105 transmits an enable reverse tracking notification to the tracker 110 at 325.

In some cases, enabling reverse tracking involves establishing a connection to the reverse tracking service, which supports the communication between the tracker 110 and tag 105 to accomplish the tag's 105 tracking of the tracker 110. Additionally, in some cases, the tag 105 transmitting an enable reverse tracking notification to the tracker 110 at 325 can signify that the tracker 110 has successfully requested and received AoA information from the tag 105 (for forward AoA locationing). Thereafter, at 330, the tracker 110 receives the enable reverse tracking notification from tag 105.

Next, the process 300 shows that tracker 115 also calculates AoA values at 335. In this case, the tracker 110 has the processing capabilities to implement a reverse locationing algorithm which utilizes the AoA information. Accordingly, the tracker 110 performs the processing necessary, such as implementing the reverse locationing algorithm, for determining location information for the tracker 110 itself, and the tag 105. In an alternative implementation, the AoA calculations are performed by both the tracker 110 and tag 105. This implementation can be practical in scenarios where the device associated with the tag 105, such as a smart phone, has the processing capabilities for performing AoA calculations, but may be otherwise limited for the purposes of locationing by the numbers of antennas used by the device.

After AoA calculations are performed, the tracker 110 transmits an angle notification to the tag 105 at 340, and the tag 105 receives the angle notification at 345. The angle notification sent to the tag 105 can include AoA calculations (and other related AoA information) performed by the tracker 110 that are provided to the tag 105 so that the tag 105 can determine the location of, or locate, the tracker 110 at 345. In some cases, the angle notification includes position and/or location information for the tracker 110 itself and the tag 105. As a result, the tag 105 is notified of the tracker's 110 location, directly from the tracker 110 (e.g., without the tag 105 having to derive a location from the AoA information). Accordingly, the disclosed techniques extend locationing capabilities, such as location awareness and asset tracking, to a tag 105 device that may have limited functionality (e.g., single antenna, and limited processing capacity).

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method comprising:
transmitting, by a first wireless device to a second wireless device, one or more reverse tracking service discovery messages via a wireless communication link;

receiving, at the first wireless device from the second wireless device via the wireless communication link, one or more response messages associated with the one or more reverse tracking service discovery messages, wherein the one or more response messages comprise (i) information indicating that the second wireless device is enabled for reverse tracking, and (ii) angle of arrival (AoA) information based on AoA calculations performed by the second wireless device; and determining, by the first wireless device, a location of the second wireless device based on the received AoA information.

2. The method of claim 1, wherein the AoA information comprises one or more of: antenna positioning, spacing between antennas, or number of antennas.

3. The method of claim 1, wherein the wireless communication link is established in accordance with Bluetooth Low Energy (BLE) technology.

4. The method of claim 3, wherein the one or more response messages are received during multiple time intervals.

5. The method of claim 4, comprising:
receiving one or more additional response messages during the multiple time intervals, wherein the one or more additional response messages comprise additional AoA information determined by the second wireless device; and
updating the determined location of the second wireless device, based on the additional AoA information.

6. The method of claim 5, wherein the received additional AoA information is associated with AoA calculations including Received Signal Strength Indication (RSSI) values.

7. The method of claim 1, comprising:
receiving, at the second wireless device from the first wireless device, a tracking service discovery message; and
transmitting, by the first wireless device to the second wireless device, a tracking response message associated with obtaining AoA information relating to the first wireless device and usable by the second wireless device to determine a location of the first wireless device.

8. A wireless device comprising:
a plurality of antennas;
transceiver electronics; and
processor electronics programmed to:
receive, via the transceiver electronics, one or more reverse tracking service discovery messages using an established wireless communication link;
perform angle of arrival (AoA) calculations using wireless signals received via the plurality of antennas; and
transmit, via the transceiver electronics using the wireless communication link, one or more response messages associated with the one or more reverse tracking service discovery messages, wherein the one or more response messages comprise (i) information indicating whether the wireless device is enabled for reverse tracking, and (ii) AoA information based on the AoA calculations.

9. The wireless device of claim 8, wherein the processor electronics are further programmed to transmit the one or more response messages via the wireless communication link to an additional wireless device.

10. The wireless device of claim 9, wherein the processing electronics are further programmed to: transmit one or more additional response messages to the additional wireless device, wherein the one or more additional response messages comprise additional AoA information determined by the wireless device.

11. The wireless device of claim 10, wherein the processing electronics are further programmed to transmit the one or more additional response messages during multiple time intervals.

12. The wireless device of claim 8, wherein the processing electronics are further programmed to perform AoA calculations comprising using a reverse locationing algorithm.

13. The wireless device claim 8, wherein the transceiver electronics establishes the wireless communication link in accordance with Bluetooth Low Energy (BLE) technology.

14. A system comprising:
a first wireless device; and
a second wireless device, communicatively coupled with the first wireless device via an established wireless communication link, the second wireless device to:
transmit to the first wireless device, one or more reverse tracking service discovery messages via the wireless communication link;
receive, from the first wireless device via the wireless communication link, one or more response messages associated with the one or more reverse tracking service discovery messages, wherein the one or more response messages comprise (i) information indicating that the first wireless device is enabled for reverse tracking, and (ii) angle of arrival (AoA) information based on AoA calculations performed by the first wireless device; and
determine a location of the first wireless device based on the received AoA information.

15. The system of claim 14, wherein the first wireless device comprises a plurality of antennas and the second wireless device is a smart phone.

16. The system of claim 14, wherein the AoA information comprises one or more of: antenna positioning, spacing between antennas, or number of antennas.

17. The system of claim 14, wherein the wireless communication link is established in accordance with Bluetooth Low Energy (BLE) technology.

18. The system of claim 14, wherein the second wireless device receives one or more additional response messages during multiple time intervals, wherein the one or more additional response messages comprise additional AoA information.

19. The system of claim 18, wherein the second wireless device updates the determined location of the first wireless device, based on the additional AoA information.

20. The system of claim 14, wherein the second wireless device is programmed to perform additional AoA calculations based on the received AoA information.

* * * * *